United States Patent
Nakanishi et al.

(10) Patent No.: US 7,838,064 B2
(45) Date of Patent: Nov. 23, 2010

(54) METHOD FOR MANUFACTURING TUBE-TYPE FUEL CELL

(75) Inventors: Haruyuki Nakanishi, Susono (JP); Shigeaki Murata, Numazu (JP); Masahiro Imanishi, Susono (JP); Yoshihisa Tamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 352 days.

(21) Appl. No.: 11/989,209

(22) PCT Filed: Aug. 30, 2006

(86) PCT No.: PCT/JP2006/317588

§ 371 (c)(1), (2), (4) Date: Jan. 22, 2008

(87) PCT Pub. No.: WO2007/026933

PCT Pub. Date: Mar. 8, 2007

(65) Prior Publication Data

US 2009/0047422 A1   Feb. 19, 2009

(30) Foreign Application Priority Data

Aug. 31, 2005   (JP) .............................. 2005-251352

(51) Int. Cl.
- B05C 1/16 (2006.01)
- H01M 8/00 (2006.01)
- H01M 4/64 (2006.01)
- H01M 4/02 (2006.01)

(52) U.S. Cl. ................... 427/115; 429/400; 429/517; 429/523

(58) Field of Classification Search ................. 427/115; 429/400, 517, 523
See application file for complete search history.

(56) References Cited

U.S. PATENT DOCUMENTS

| | | | |
|---|---|---|---|
| 4,598,028 A * | 7/1986 | Rossing et al. | 429/30 |
| 2003/0228513 A1* | 12/2003 | Wei et al. | 429/38 |

FOREIGN PATENT DOCUMENTS

| | | |
|---|---|---|
| JP | 06-150949 A | 5/1994 |
| JP | 09-223507 A | 8/1997 |
| JP | 09-245812 A | 9/1997 |
| JP | 2000-243414 A | 9/2000 |
| JP | 2001-229933 * | 8/2001 |
| JP | 2001-229933 A | 8/2001 |
| JP | 2002-124273 A | 4/2002 |

(Continued)

*Primary Examiner*—Michael Cleveland
*Assistant Examiner*—Austin Murata
(74) *Attorney, Agent, or Firm*—Kenyon & Kenyon LLP (57) ABSTRACT

A method for manufacturing a tube-type fuel cell by which a tube-type fuel cell with good adhesion can be produced without blocking a gas flow channel in its inner current collector. The method for manufacturing a tube-type fuel cell may include a filling step of providing a columnar-shaped inner current collector having a gas flow channel on its outer peripheral face and filling the gas flow channel with a removable substance to form a removable portion. Also a functional layer forming step of forming a functional layer on at least the removable portion and a removing step of removing the removable portion after the functional layer forming step may be used.

7 Claims, 3 Drawing Sheets

FOREIGN PATENT DOCUMENTS

| | | |
|---|---|---|
| JP | 2002-246040 A | 8/2002 |
| JP | 2002-367630 A | 12/2002 |
| JP | 2004-505417 A | 2/2004 |
| JP | 2004-158335 A | 6/2004 |
| JP | 2005-038695 A | 2/2005 |
| WO | WO 02/09212 A1 | 1/2002 |
| WO | WO 2004/067259 A1 | 8/2004 |

* cited by examiner

METHOD FOR MANUFACTURING TUBE-TYPE FUEL CELL

This is a 371 national phase application of PCT/JP2006/317588 filed 30 Aug. 2006, claiming priority to Japanese Patent Application No. 2005-251352 filed 31 Aug. 2005, the contents of which are incorporated herein by reference.

TECHNICAL FIELD

The present invention relates to a method for manufacturing a tube-type fuel cell by which a tube-type fuel cell with good adhesion can be produced without blocking gas flow channel in its inner current collector.

BACKGROUND ART

A unit cell which is a minimum electric generating cell unit of a prior art solid polymer electrolyte type fuel cell having a flat-plate structure (hereinafter referred briefly to "flat-type fuel cell" in some cases) generally has a membrane electrode assembly in which catalytic electrode layers are connected to both sides of a solid electrolyte membrane. Further, gas diffusion layers are disposed on both sides of the membrane electrode assembly. Further, separators each having a gas flow passage are disposed on outer sides of the gas diffusion layers. The separator functions to flow a fuel gas and an oxidant gas fed into the catalytic electrode layers via the gas-diffusion layers and to conduct an electric current obtained by electric generation to the outside.

In order to miniaturize the flat-type fuel cell and enlarge the electric generating reaction area per unit volume, the thicknesses of the constituting members of the flat-type fuel cell need to be small. In such conventional flat-type fuel cells, it is not preferable from the standpoint of the function and the strength to make the thickness of each constituting member small to a certain value or less, so that they are reaching the design limit. Under the circumstances, tubular or columnar fuel cells in which respective layers constituting the fuel cell are laminated coaxially have been developed.

For example, Patent document 1 discloses a tube-type fuel cell in which an inner current collector, an inner catalytic electrode layer, a solid electrolyte membrane, an outer catalytic electrode layer, an outer current collector are provided coaxially and in sequence order from the inner side. This tube-type fuel cell has gas flow passages on the outer peripheral face of the inner current collector and on the inner peripheral face of the outer current collector. Since such tube-type fuel cells can be closely arranged in a given space when the diameter of the fuel cells is smaller, the electrode area per unit volume can be largely increased as compared with the conventional flat-type fuel cell.

For example, a method for manufacturing such a tube-type fuel cell includes sequentially providing, on an inner current collector, an inner catalytic electrode layer, a solid electrolyte membrane, an outer catalytic electrode layer, and an outer current collector in this order. Specifically, such a method includes applying an inner catalytic electrode layer forming-composition to the inner current collector, drying the composition to form the inner catalytic electrode layer on the outer peripheral face of the inner current collector, and forming the solid electrolyte membrane and the like by similar methods so that the tube-type fuel cell is formed in sequence. In this method, the catalytic electrode layer and the like are formed by coating. Therefore, this method has the advantage that a tube-type fuel cell with good adhesion between adjacent layers can be obtained.

However, the above method has the problem as follows. Since gas flow channels are formed on the outer peripheral face of the inner current collector, the application of the inner catalytic electrode layer forming-composition thereto causes a problem in which part of the composition enters and blocks the gas flow channels.

Patent Document 1: Japanese Patent Application Laid-Open No. 2002-124273

Patent Document 2: Japanese Patent Application Laid-Open No. 09-223507.

DISCLOSURE OF THE INVENTION

The present invention has been made in view of the above problems, and it is a main object of the present invention to provide a method for manufacturing a tube-type fuel cell by which a tube-type fuel cell with good adhesion can be produced without blocking gas flow channel in its inner current collector.

In order to achieve the object, the present invention provides a method for manufacturing a tube-type fuel cell, comprising: filling step of providing a columnar-shaped inner current collector having a gas flow channel on its outer peripheral face and filling the gas flow channel with a removable substance to form a removable portion; functional layer forming step of forming a functional layer on at least the removable portion; and removing step of removing the removable portion after the functional layer forming step.

According to the present invention, a removable portion is formed in a gas flow channel, and a functional layer such as an inner water-repellent layer and an inner catalytic electrode layer is formed on the removable portion, and then the removable portion is removed, so that the functional layer can be prevented from blocking the gas flow channel. If the blocking of the gas flow channel is prevented, a tube-type fuel cell with high electric generation efficiency can be obtained. According to the present invention, functional layers can be sequentially formed on the removable portion and the inner current collector so that a tube-type fuel cell with good adhesion between the inner current collector and the functional layer and with good adhesion between the functional layers can be obtained. According to the present invention, the gas flow channel is filled with a removable substance so that there is provided the advantage that the shape of the gas flow channel can be selected freely. For example, in a conventional art, it is difficult to directly form a functional layer such as an inner water-repellent layer and an inner catalytic electrode layer on an inner current collector with a large-width gas flow channel. On the other hand, according to the present invention, such a functional layer can be formed to the arbitrary-shaped gas flow channel. Thus, an inner current collector with an optimized gas flow function and an optimized electricity-collecting function can be obtained, so that a tube-type fuel cell with high electric generation efficiency can be obtained.

In the above invention, it is preferable that the columnar-shaped inner current collector has a circular cross-section.

In the above invention, it is preferable that the removable substance is a liquid-removable substance that can be removed by allowing a liquid to flow through the gas channel or a heat-removable substance that can be removed by heating the gas flow channel. This is because the removable portion can be easily removed using a liquid or heat.

In the above invention, it is preferable that the liquid-removable substance is polyvinyl alcohol. This is because the removable portion can be easily removed using water or hot water.

In the above invention, it is preferable that the heat-removable substance is paraffin.

In the above invention, it is preferable that the functional layer is an inner water-repellent layer. This is because it has the advantage that the removing step can be easily performed.

In the above invention, it is preferable that the functional layer is an inner catalytic electrode layer. This is because it has the advantage that the removing step can be easily performed.

The present invention exhibits the effect that there is provided the advantage that a tube-type fuel cell with good adhesion can be obtained without blocking gas flow channel in its inner current collector.

BEST MODE FOR CARRYING OUT THE INVENTION

In the following, the method for manufacturing a tube-type fuel cell of the present invention will be explained in detail.

Figure 1A:
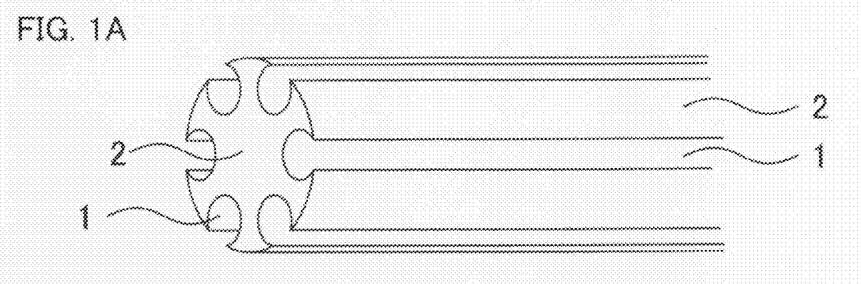
FIGS. 1A to 1D are process drawings showing an example of the method for manufacturing a tube-type fuel cell of the present invention.
Figure 1B:
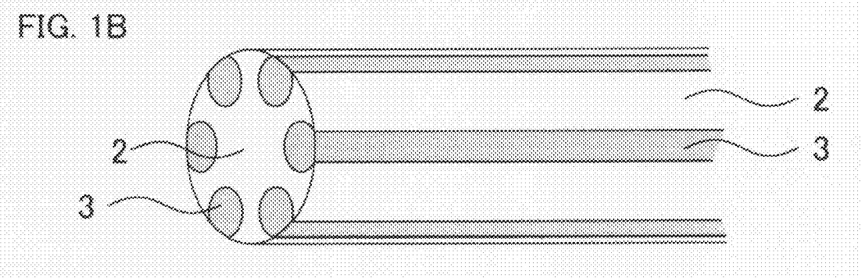
Figure 1C:
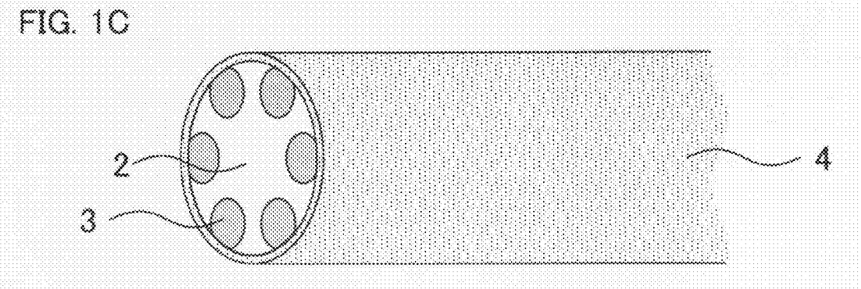
Figure 1D:
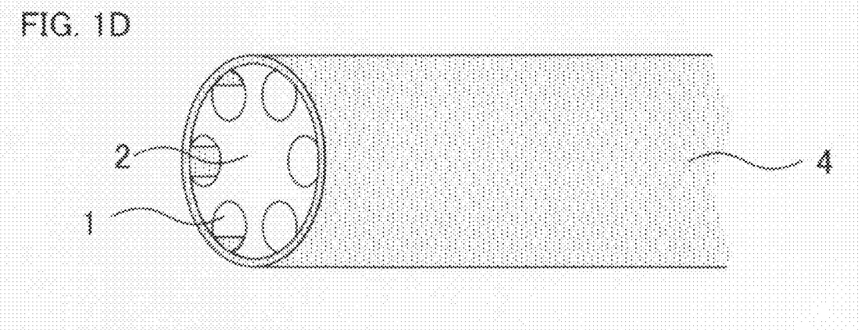

First, the method for manufacturing a tube-type fuel cell of the present invention is described with reference to the drawings. FIGS. 1A to 1D are process drawings showing an example of the method for manufacturing tube-type fuel cell of the present invention. A method for manufacturing a tube-type fuel cell comprises: a filling step of providing a cylindrical inner current collector 2 having the gas flow channels 1 on its outer peripheral face as shown in FIG. 1A and filling the gas flow channels 1 with a removable substance to form the removable portions 3 as shown in FIG. 1B; functional layer forming step of forming a functional layer 4 on at least the removable portions 3 (on the inner current collector 2 and the removable portions 3 in FIG. 1C); and removing step of removing the removable portions 3 as shown in FIG. 1D after the functional layer forming step.

In the following, the filling step, the functional layer forming step, and the removing step in the present invention will be explained.

1. Filling Step

First, the filling step in the present invention will be explained. In the present invention, the filling step includes providing a columnar-shaped inner current collector having a gas flow channel on its outer peripheral face and filling the gas flow channel with a removable substance to form a removable portion.

(1) Inner Current Collector

The inner current collector to be used in the present invention has a gas flow channel on its outer peripheral face and a columnar shape and collects electrons produced by an electric generating reaction.

Figure 2:
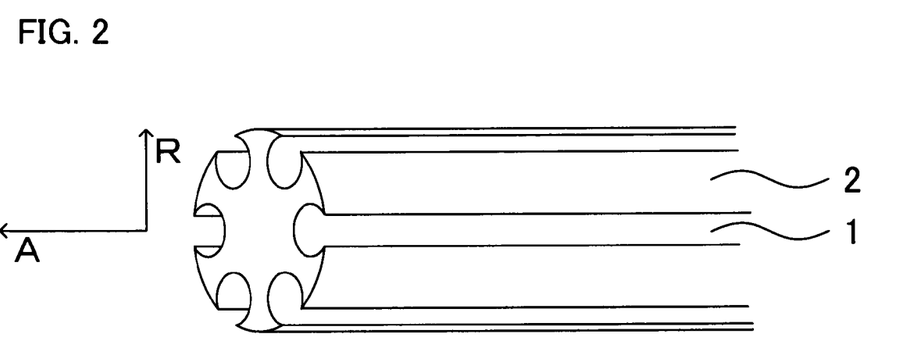
FIG. 2 is a schematic diagram showing the function of the gas flow channel in an inner current collector.

The gas flow channel formed on the outer peripheral face of the inner current collector has the function of distributing gas in the axial and radial directions of the inner current collector. Specifically, as shown in FIG. 2, the gas flow channel allows gas to flow in the axial direction A of the inner current collector 2 so that the gas can be distributed throughout a tube-type fuel cell, and the gas flow channel also allows the gas to flow in the radial direction R of the inner current collector 2 so that the gas can be fed to an inner catalytic electrode layer.

The gas flow channel formed on the outer peripheral face of the inner current collector may be in any form. For example, a groove may be formed on the outer peripheral face of the inner current collector to serve as the gas flow channel. Alternatively, for example, a plurality of electric conductors may be bundled and twisted to form a stranded wire-like inner current collector, in which the airspace thereof may be used as the gas flow channel.

While there is no particular limitation on the size of the gas flow channel, for example, in a case where the groove is formed to serve as the gas flow channel on the outer peripheral face of the inner current collector, the width of the groove is preferably in the range of 0.01 mm to 2 mm and more preferably in the range of 0.05 mm to 0.2 mm, and the depth of the groove is preferably in the range of 0.01 mm to 2 mm and more preferably in the range of 0.05 mm to 0.4 mm.

Figure 3:
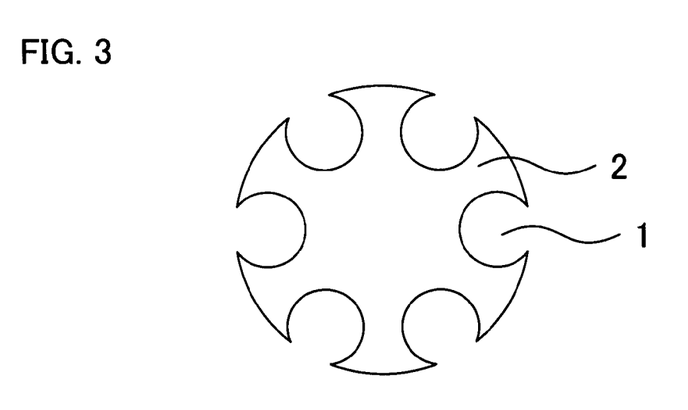
FIG. 3 is a schematic cross-sectional view showing an example of the radial cross-section of an inner current collector.

The inner current collector has a columnar shape. As used herein, the term "columnar shape" means that the inner current collector is in the form of a column in which the figure of the edge in the radial cross-section thereof is a circle, an ellipse or a polygon. The above figure is determined without consideration of the chipped portion corresponding to the gas flow channel in the radial cross-section. Therefore, for example, even if the radial cross-section of the inner current collector 2 has chipped portions corresponding to the gas channels 1 as shown in FIG. 3, the inner current collector 2 falls under the category of the "columnar shape" of the present invention. In the same manner, the stranded wire-like inner current collector as mentioned above also falls under the category of the "columnar shape" of the present invention. In the present invention, the inner current collector preferably has a circular or elliptical cross-section in its radial direction.

When the inner current collector has a circular cross-section in its radial direction, specifically, its diameter is, but not limited to, preferably in the range of 30 to 5000 µm and more preferably in the range of 500 to 2000 µm. Specifically, the length of the inner current collector is, but not limited to, preferably in the range of 5 to 100 cm and more preferably in the range of 10 to 30 cm.

The inner current collector may be a hollow inner current collector, in this way, reduction in the material of the inner current collector and reduction in weight thereof can be attained. Furthermore, when a heat medium or a coolant is flown in a hollow portion, the tube-type fuel cell can be heated or cooled. When a material for the inner current collector is expensive, its central portion may use an inexpensive material so that the material cost can be reduced.

Further, as the material for the inner current collector, one having high electroconductivity and corrosion resistance is preferred. Such a material is not particularly limited, but specific examples thereof include titanium, stainless steel, platinum, gold, $SiO_2$, $B_2O_3$, $Nd_2O$, titanium-based alloys such as TiC, $TiSi_2$ and $TiB_2$, carbon, electroconductive ceramics, and electroconductive resins.

Any method may be used to form the above groove on the outer peripheral face of the inner current collector. For example, when or after the material for the inner current collector is formed into a column, a die made of a hard material such as diamond may be placed so as to be pressed to the outer peripheral face of the inner current collector, and both may be relatively shifted, so that the groove can be formed. Alternatively, the groove may be formed directly by pressing a die made of a hard material to the outer peripheral face of the inner current collector. The groove for the flow channel with the desired shape may also be formed by grinding a columnar electroconductive material. In the present invention, however, the groove is preferably formed by the method of pressing a die to the outer peripheral face of the inner current collector. This method can prevent sawdust production and the like and thus does not require removing sawdust and the like so that problems such as blocking of the formed groove with sawdust can be prevented.

(2) Removable Portion

Next, the removable portion of the present invention will be explained. In the present invention, the removable portion is formed by filling the gas flow channel of the inner current collector with a removable substance. The removable portion is removed in the removing step after the functional layer forming step.

The removable substance may be any substance removable by the removing step described later. Examples of the removable substance include liquid-removable substances that can be removed by allowing a liquid to flow through the gas channel, heat-removable substances that can be removed by heating the gas flow channel, gas-removable substances that can be removed by injecting gas into the gas flow channel, and light-removable substances that can be removed by light irradiation.

The liquid-removable substance may be any substance that can be removed by allowing a liquid to flow through the gas flow channel and allows the formation of the removable portion and allows the formation of the functional layer on the removable portion. Examples thereof include polymers, gels and powders.

The liquid-removable substance is preferably water-soluble, because the removable portion can be easily removed using water as the liquid allowed to flow through the gas flow channel. Examples of the water-soluble liquid-removable substance include polyvinyl alcohol, hydroxycellulose, polyalginic acid, sugar, agar (gelatin), and caramel. In particular, polyvinyl alcohol is preferred.

The liquid-removable substance is preferably an acid solution-decomposable substance, because the removable portion can be easily removed using an acid solution as the liquid allowed to flow through the gas flow channel. In general, the inner catalytic electrode layer described later is highly resistant to acid solutions. Thus, the removable portion may be removed using an acid solution, even when the removing step is performed after the formation of the inner catalytic electrode layer. Examples of the acid solution-decomposable liquid-removable substance include alkali metals, alkaline earth metals and salts thereof.

The liquid allowed to flow the gas flow channel may be any liquid capable of removing the removable portion. Examples of the liquid include solutions using water or organic materials as a solvent. The liquid allowed to flow through the gas flow channel preferably does not deteriorate the functional layer. For example, in a case where the removable portion is removed after the inner catalytic electrode layer described later is formed as the functional layer, a liquid that does not deteriorate the inner catalytic electrode layer is preferably allowed to flow through the gas flow channel. Specifically, an aqueous acidic solution or water is preferred, and water is particularly preferred. The liquid may be allowed to flow through the gas flow channel at room temperature or in a heated state.

Next, the heat-removable substance will be explained. The heat-removable substance may be any substance that can be removed by heating the gas flow channel and allows the formation of the removable portion and allows the formation of the functional layer on the removable portion. Examples thereof include low-melting-point organic solids, polymers, gels, and powders.

The heat-removable substance is preferably a heat-melting substance, because the removable portion can be easily removed by heating the gas flow channel. Examples of the heat-melting substance include paraffins.

The heat-removable substance is preferably a material capable of being gasified by heat, because the removable portion can be easily removed by heating the gas flow channel. For example, in a case where an inner water-repellent layer is formed as the functional layer in the functional layer forming step described later, a composition for forming the inner water-repellent layer is generally applied and heated. In this heating process, the heat-removable substance can be preferably gasified and removed at the same time. For example, the heat-removable substance capable of being gasified by heat may be ammonium carbonate or the like.

Examples of the method for removing the heat-removable substance by heating include, but are not limited to, methods using a heating furnace and methods of generating heat by energizing the collector.

Next, the gas-removable substance will be explained. The gas-removable substance may be any substance that can be removed by injecting gas into the gas flow channel and allows the formation of the removable portion and allows the formation of the functional layer on the removable portion. Examples thereof include powders. Examples of powders include alumina and the like. Powders may also be used for the liquid-removable substance or the heat-removable substance.

The gas to be injected into the gas flow channel may be of any type, as long as it can remove the removable portion. Examples thereof include air, nitrogen and the like.

2. Functional Layer Forming Step

Next, the functional layer forming step in the present invention will be explained. In the present invention, the functional layer forming step is a step of forming the functional layer on at least the removable portion. In the present invention, the term "functional layer" is a generic name for layers that can provide a certain function and are formed on the removable portion before the removing step described later. Thus, the functional layer may be a single layer or two or more layers depending on the timing of the removing step. For example, in a case where an inner water-repellent layer is provided on the removable portion when the removing step is performed, the functional layer means the inner water-repellent layer. For example, in a case where a solid electrolyte membrane is formed on an inner catalytic electrode layer provided on the removable portion when the removing step is performed, the functional layer means the inner catalytic electrode layer and the solid electrolyte membrane. In the tube-type fuel cells, an inner water-repellent layer or an inner catalytic electrode layer is formed on the removable portion generally.

The functional layer may be of any type, as long as it is formed on at least the removable portion. It may be formed on the removable portion and on part of the inner current collector or may be formed on the removable portion and on the entire surface of the inner current collector.

As mentioned above, the functional layer may be a single layer or two or more layers. When the functional layer is a single layer, specific examples thereof include an inner water-repellent layer and an inner catalytic electrode layer. On the other hand, when the functional layer is two or more layers, layer structure thereof is not particularly limited and any structure may be employed. Examples of such a structure include in the order from the inner current collector side: the inner catalytic electrode layer and the solid electrolyte membrane; the inner catalytic electrode layer, the solid electrolyte membrane and the outer catalytic electrode layer; the inner catalytic electrode layer, the solid electrolyte membrane, the outer catalytic electrode layer and the outer current collector; the inner water-repellent layer and the inner catalytic electrode layer; the inner water-repellent layer, the inner catalytic electrode layer and the solid electrolyte membrane; the inner water-repellent layer, the inner catalytic electrode layer, the solid electrolyte membrane and the outer catalytic electrode layer; the inner water-repellent layer, the inner catalytic electrode layer, the solid electrolyte membrane, the outer catalytic electrode layer and outer the water-repellent layer; and the inner water-repellent layer, the inner catalytic electrode layer, the solid electrolyte membrane, the outer catalytic electrode layer, the outer water-repellent layer and outer current collector. In the present invention, it is preferable that the functional layer is an inner water-repellent layer or an inner catalytic electrode layer, and it is more preferable that the functional layer is an inner water-repellent layer, because it has the advantage that the removing step can be easily performed. In particular, the inner water-repellent layer generally has high chemical resistance, high heat or thermal resistance and the like and thus has the advantage that the removing step can be easily performed.

Figure 4A:
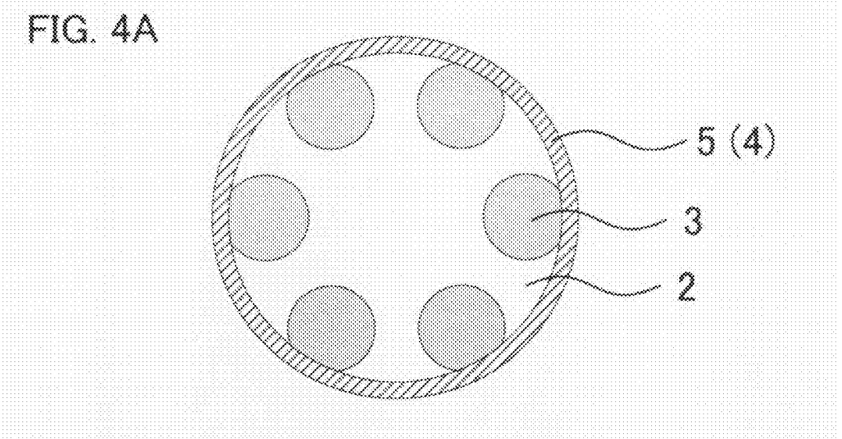
FIGS. 4A to 4C are schematic diagrams showing examples of the functional layer.
Figure 4B:
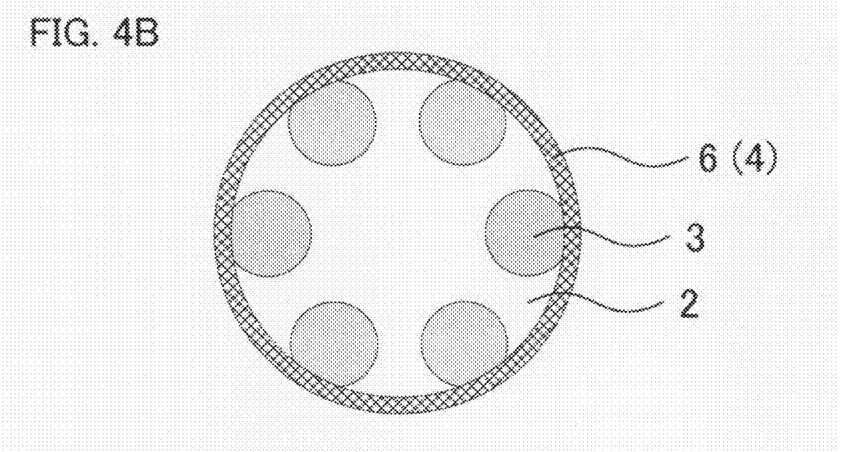
Figure 4C:
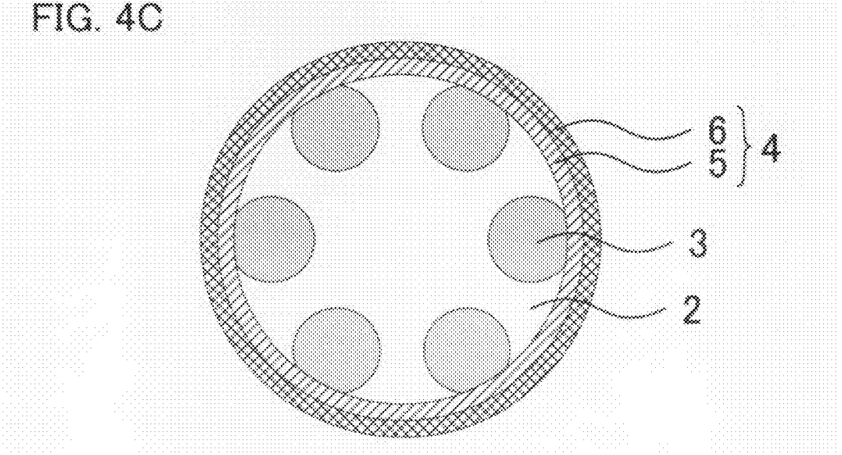

Examples of such functional layers are illustrated in FIGS. 4A to 4C. In FIG. 4A, an inner water-repellent layer 5 corresponding to the functional layer 4 is formed on the removable portion 3 and the inner current collector 2. In FIG. 4B, an inner catalytic electrode layer 6 corresponding to the functional layer 4 is formed on the removable portion 3 and the inner current collector 2. In FIG. 4C, an inner water-repellent layer 5 and an inner catalytic electrode layer 6 corresponding to the functional layer 4 are formed on the removable portion 3 and the inner current collector 2.

A description is given below of the inner water-repellent layer, the inner catalytic electrode layer, the solid electrolyte membrane, the outer catalytic electrode layer, the outer water-repellent layer, and the outer current collector, which is (are) constituting the functional layer.

(1) Inner Water-Repellent Layer

The inner water-repellent layer to be used in the present invention has the function of facilitating discharge of water produced by the electric generating reaction and is generally disposed between the inner current collector and the inner catalytic electrode layer. The inner water-repellent layer also has a porous structure to allow gas to pass therethrough. While the inner water-repellent layer to be used in the present invention may include any material capable of facilitating the discharge of the produced water, it specifically includes a water-repellent material and an electroconductive material.

The water-repellent material is not particularly limited, so long as it has water repellency. An example thereof includes a fluororesin. Specific examples of the fluororesin include polytetrafluoroethylene (PTFE), ethylene-tetrafluoroethylene copolymer (ETFE), tetrafluoroethylene-perfluoroalkyl vinyl ether copolymer (PFA), perfluoroethylenepropene copolymer (FEP), fluorinated vinylidene-tetrafluoroethylene-hexafluoropropylene copolymer, polyfluorinated vinylidene, fluoroolefin-hydrocarbon-based copolymer, fluoroacrylate copolymer, fluoroepoxy compound, and Among them, polytetrafluoroethylene (PTFE) is preferable in the present invention. This is because the water repellent layer having excellent water repellency can be obtained.

The content of the water-repellent material in the inner water-repellent layer is not particularly limited, and is preferably in a range of 5 to 80 mass % and more preferably in a range of 10 to 60 mass %.

The electroconductive material is not particularly limited, so long as it has electroconductivity. Examples thereof include electroconductive particles such as carbon black. Specific examples of the carbon black include oil furnace black, acetylene black, thermal black, and channel blacks. Among them, oil furnace black and acetylene black are preferable, because they have excellent electroconductivity-imparting effect. Further, the diameter of the primary particle of the electroconductive particle is not particularly limited, and is preferably not more than 1 µm.

The content of the electroconductive material in the inner water-repellent layer is not particularly limited, and is preferably in a range of 20 to 95 mass % and more preferably in a range of 40 to 90 mass %. If the content of the electroconductive material is too low, electrical conductivity can be insufficiently imparted. If the content of the electroconductive material is too high, the water repellency of the water-repellent layer can be reduced.

The thickness of the inner water-repellent layer is not particularly limited, and is preferably in the range of 1 to 1000 µm and more preferably in the range of 5 to 50 µm.

While the inner water-repellent layer may be formed using any method, it may be generally formed using a method that includes coating the removable portion with an inner water-repellent layer forming-composition containing the water-repellent material and the electroconductive material, and heating the coat. In this process, the heating temperature is generally, but not limited to, about 350° C.

(2) Inner Catalytic Electrode Layer

The inner catalytic electrode layer to be used in the present invention is a layer offering an electric generating reaction and generally disposed between the inner current collector or the inner water-repellent layer and the solid electrolyte membrane. As the inner catalytic electrode layer, one similar to the catalytic electrode layer used in the general flat-type fuel cell can be used, and no limitation is imposed upon it. An example thereof includes an inner catalytic electrode layer comprising an electrolyte material such as a perfluorosulfonic acid-based polymer, an electroconductive material such as carbon black and a catalyst such as platinum. Further, the thickness of the inner catalytic electrode layer is not particularly limited, and is preferably in a range of 1 to 100 µm and more preferably in a range of 5 to 20 µm.

The inner catalytic electrode layer may be formed by any method. For example, the inner catalytic electrode layer may be directly formed on the removable portion by a method that includes applying, onto the removable portion, a catalytic electrode layer forming-composition containing the electrolyte material, the electroconductive material and the catalyst, and then drying the composition. Alternatively, when the inner water-repellent layer is already formed on the removable portion, an inner catalytic electrode layer that has been previously formed into a tube may be placed on the inner water-repellent layer. In view of adhesion, however, the method of applying and drying the catalytic electrode layer forming-composition is preferred.

(3) Solid Electrolyte Membrane

The solid electrolyte membrane to be used in the present invention is a layer for transferring protons and generally disposed between the inner catalytic electrode layer and the outer catalytic electrode layer. As the solid electrolyte membrane, one similar to the catalytic electrode layer employed in the general flat-type fuel cell can be used, and no limitation is imposed upon it. Specific examples thereof include perfluorosulfonic acid-based polymers represented by Nafion (trade name, manufactured by DuPont), and hydrocarbon-based resins represented by amide-based resins. Examples of methods for forming such a solid electrolyte membrane include, but are not limited to: a method of applying and drying a solid electrolyte membrane forming-composition; and a method of placing, on the inner catalytic electrode layer, a tube-shaped solid electrolyte membrane that has previously been formed.

Furthermore, as other example of the solid electrolyte membrane, an inorganic solid electrolyte membrane composed mainly of an oxide of silicon can be cited. Examples of the inorganic solid electrolyte membrane include a solid electrolyte membrane using a porous glass, and a solid electrolyte membrane using a phosphate glass. An Example of the solid electrolyte membrane using the porous glass includes one obtained by reacting a silane coupling agent such as mercaptopropyltrimethoxy silane with OH groups at inner surfaces of fine pores of the porous glass, and then introducing proton-conductive sulphonic groups by oxidizing the mercapto groups (—SH). With respect to this producing method, "Chemistry and Chemical Industry", Vol. 57, No. 1 (2004), pp 41-44, can be referred. On the other hand, as to the solid electrolyte membrane using the phosphate glass, "Fuel Cells", Vol. 3, No. 3, 2004, pp 69-71, can be referred. Examples of methods for producing such a solid electrolyte membrane include, but are not limited to, methods of placing, on the inner catalytic electrode layer, a tube-shaped solid electrolyte membrane that has previously been formed.

(4) Outer Catalytic Electrode Layer

The outer catalytic electrode layer to be used in the present invention is a layer offering an electric generating reaction and generally disposed between the solid electrolyte membrane and the outer current collector or the outer water-repellent layer. As the outer catalytic electrode layer, what is described in connection with the above "(2) Inner Catalytic Electrode Layer" is also applicable, and therefore explanation thereof is omitted here.

(5) Outer Water-Repellent Layer

The outer water-repellent layer to be used in the present invention has the function of facilitating discharge of water produced by the electric generating reaction and is generally disposed between the outer current collector and the outer catalytic electrode layer. As the outer water-repellent layer, what is described in connection with the above "(1) Inner Water-Repellent Layer" is also applicable, and therefore explanation thereof is omitted here.

(6) Outer Current Collector

The outer current collector to be used in the present invention is for collecting electrons produced by the electric generating reaction and generally disposed outside the outer catalytic electrode layer or the outer water-repellent layer. The shape of the outer current collector is not particularly limited, so long as it enables the gas to flow in radial directions of the tube-type fuel cell. A spring-like shape, a network shape, a helical shape, etc. can be cited, and among them the spring-like shape is preferable. Furthermore, the outer current collector may be a cylindrical one partially formed with pores. As the material for the outer current collector, a material having high electroconductivity is preferable. Such a material is not particularly limited, but specific examples thereof include titanium, stainless steel, platinum, gold, $SiO_2$, $B_2O_3$, $Nd_2O$, titanium-based alloys such as TiC, $TiSi_2$ and $TiB_2$, carbon, electroconductive ceramics, and electroconductive resins.

3. Removing Step

Next, the removing step in the present invention will be explained. In the present invention, the removing step is the step of removing the removable portion after the functional layer forming step. In this step, the removable portion may be removed by a method depending on the properties of the removable portion. The properties of the removable portion and the corresponding removal methods are described above in the section "1. Filling Step," and thus the description is not repeated here. In the present invention, if the functional layer does not cover all the necessary layers for the fuel cell, the other necessary layers should be formed after the removing step is completed. For example, when the removing step is performed after only the inner water-repellent layer is formed as the functional layer, the other layers such as the inner catalytic electrode layer are formed after the removing step is completed, so that a tube-type fuel cell is produced.

The embodiments described above are not intended to limit thereto. The embodiments described above are merely exemplary, and any other embodiment having substantially the same feature and producing substantially the same effect or advantage as the technical idea defined by Claims will fall within the technical scope of the invention.

EXAMPLES

Hereinafter, the invention will be more specifically described with reference to examples.

Example 1

Powdery polyvinyl alcohol (PVA) was sprayed on the groove portions (gas flow channels) of a cylindrical inner current collector ($\phi$=0.85 mm×180 mm, 0.1 mm grooves) and then dried to form removable portions. An inner water-repellent layer forming-composition containing the same amounts of polytetrafluoroethylene (PTFE) and acetylene black was then applied to the inner current collector and the removable portions so that an inner water-repellent layer was formed. The resulting component was then immersed in water so that the PVA was removed. After the PVA was removed, the gas flow channels were examined. As a result, it was determined that no gas flow channel was blocked.

Example 2

Paraffin was applied to the grooves (gas flow channels) of the same inner current collector as used in Example 1 so that removable portions were formed. An inner water-repellent layer forming-composition containing the same amounts of polytetrafluoroethylene (PTFE) and acetylene black was then applied to the inner current collector and the removable portions so that an inner water-repellent layer was formed. The resulting component was then heated at 150 to 200° C. so that the paraffin was removed. After the paraffin was removed, the gas flow channels were examined. As a result, it was determined that no gas flow channel was blocked.

Example 3

Powdery polyvinyl alcohol (PVA) was sprayed on the groove portions (gas flow channels) of the same inner current collector as used in Example 1 and then dried to form removable portions. Then, an inner water-repellent layer, an inner catalytic electrode layer (15 μm in thickness), a solid electrolyte membrane (45 μm in thickness), an outer catalytic electrode layer (15 μm in thickness), and an outer water-repellent layer were sequentially formed by a spray method, and finally, an outer current collector was placed therearound. The resulting component was then immersed in water so that the PVA was removed. After the PVA was removed, the gas flow channels were examined. As a result, it was determined that no gas flow channel was blocked.

The invention claimed is:

1. A method for manufacturing a tube-type fuel cell, comprising:
   a filling step of providing a columnar-shaped inner current collector having a circular gas flow channel on its outer peripheral face and filling the circular gas flow channel with a removable substance to form a removable portion;
   a functional layer forming step of forming a functional layer on at least the removable portion; and
   a removing step of removing the removable portion after the functional layer forming step,
   wherein a diameter of the circular gas flow channel is larger than an opening width of the circular gas flow channel at an outer surface of the inner current collector.

2. The method for manufacturing a tube-type fuel cell according to claim 1, wherein the columnar-shaped inner current collector has a circular cross-section.

3. The method for manufacturing a tube-type fuel cell according to claim 1, wherein the removable substance is a liquid-removable substance that can be removed by allowing a liquid to flow through the circular gas flow channel or a heat-removable substance that can be removed by heating the circular gas flow channel.

4. The method for manufacturing a tube-type fuel cell according to claim 3, wherein the liquid-removable substance is polyvinyl alcohol.

5. The method for manufacturing a tube-type fuel cell according to claim 3, wherein the heat-removable substance is paraffin.

6. The method for manufacturing a tube-type fuel cell according to claim 1, wherein the functional layer is an inner water-repellent layer.

7. The method for manufacturing a tube-type fuel cell according to claim 1, wherein the functional layer is an inner catalytic electrode layer.

* * * * *